United States Patent
Nakata

[19]

[11] Patent Number: 6,061,120

[45] Date of Patent: May 9, 2000

[54] INFRARED MICROSCOPE

[75] Inventor: Yasushi Nakata, Kyoto, Japan

[73] Assignee: Shimadzu Corporation, Kyoto, Japan

[21] Appl. No.: 09/221,115

[22] Filed: Dec. 28, 1998

[30] Foreign Application Priority Data

Dec. 29, 1997 [JP] Japan ................................. 9-368143

[51] Int. Cl.[7] .................................................. G02B 21/06
[52] U.S. Cl. ............................................... 356/51; 359/371
[58] Field of Search .............................. 356/51, 399, 346,
356/400; 250/201.3, 226, 306, 307–311;
359/385, 393, 391, 398, 371, 370

[56] References Cited

U.S. PATENT DOCUMENTS 5,780,853  7/1998  Mori et al. .............................. 250/310

*Primary Examiner*—Frank G. Font
*Assistant Examiner*—Tu T. Nguyen
*Attorney, Agent, or Firm*—Armstrong, Westerman, Hattori, McLeland & Naughton

[57] ABSTRACT

When an operator causes an angle change, a rotation controller controls rotation of an aperture structure with an aperture. At the same time, a deviation amount calculator calculates a positional deviation change amount based on angles of the aperture relative to a sample through rotation and deviation parameters regarding a deviation between a rotation axis of the aperture and a center of the aperture. Then the deviation amount calculator sends the positional deviation change amount to a horizontal motion controller. The horizontal motion controller controls a sample stand driving means to move a sample stand in the X-axis and Y-axis direction corresponding to the positional deviation change amount. The position of a sample is automatically adjusted to keep a spot of the sample at the center of the aperture through angle adjustment.

10 Claims, 3 Drawing Sheets

INFRARED MICROSCOPE

BACKGROUND OF THE INVENTION

1. Field of the Invention

The present invention relates to an infrared microscope analyzing a sample by irradiating infrared light onto the sample and measuring the spectra of the infrared light which passes through or reflects from the sample.

2. Description of the Related Art

In an infrared microscope, infrared light is projected on a sample, and the infrared light that has passed through the sample (or reflect from the sample surface) is spectrally measured, whereby the sample is analyzed. It is usually the case that a only limited area of the sample is required to be analyzed. In an analysis using the infrared microscope, an area caught within a field of view at each instance is generally a microscopic area of about 100 μm to 1 mm. But according to circumstances, an analysis is carried out which specifically focuses on a much smaller area within the microscopic, a small foreign body, and the like discovered in the microscopic area. An infrared microscope generally has a field of view limitation mechanism composed of aperture plates and the like to analyze microscopic areas and bodies on a sample surface. If a field of view is limited suitably by the field of view limitation mechanism, noise and the like caused by an infrared light coming out of an undesired area or object is suppressed and a more accurate spectrum analysis can be carried out.

FIGS. 4(a) and (b) are a schematic diagrams of a main body around an aperture structure of a typical infrared microscope, wherein FIG. 4(a) shows a front view in which only the aperture structure 30 is shown in a vertical sectional view, and FIG. 4(b) shows a horizontal sectional view taken on line 4(b)–4(b) of FIG. 4(a).

A sample stand 41 is movable in a two dimensional plane of X-Y (furthermore, movable in the elevational direction, Z axis) by a sample stand driver not shown in the Figure. An objective optical system 42 comprising a lens, not shown in the Figure, and the like is disposed right above the sample stand 41. Above the objective optical system 42, the aperture structure 30 is disposed with its rotation axis 43 aligned with a central axis of the objective optical system 42. The aperture structure 30 includes an aperture holder 31 and four pieces of aperture plates 32–35. The aperture holder 31 is held in a pivotable condition about the rotation axis 43 in the main body of the infrared microscope, not shown in the Figure. A pair of opposite aperture plates 32, 34 among the four pieces of aperture plates 32–35 are slidably attached to the aperture holder 31 for movement on a straight line parallel to the X axis. The other pair of opposite aperture plates 33, 35 are also slidably attached to the aperture holder 31 for movement on a straight line parallel to the Y axis. An aperture driver, not shown in the Figure, is structured to move each aperture plate in each pair of aperture plates (32, 34 and 33, 35) in the opposite direction from each other in synchronization by the same distance. The aperture driver also rotates the whole the aperture holder 31 about the rotation axis 43 within a designated angle range. The sample stand driver and aperture driver may both be mechanically connected to manual operation of a knob and the like, respectively. Alternatively these drivers may be driven electrically by a motor and the like, respectively.

In case of analyzing a sample by the above infrared microscope, a sample 44 is placed on the sample stand 41 right under the objective optical system 42, then a visible light source 45 is turned on. The position of the sample stand 41 in the Z axis direction is properly adjusted and an enlarged image of the sample 44 is focused on a imaging surface of the aperture structure 30. The imaging surface is the contact surface between an upper aperture plate 33 and lower aperture plate 32 and 34. For example, as operators do visual observation of the enlarged image limited by an aperture 36, they adjust the position of each aperture plate 32–35, the rotation angle of the aperture holder 31, and the position of the sample stand 41 on the X-Y plane through proper operations so that the only desired part of the sample 44 can be observed through the aperture 36. When the above adjustments complete, the visible light source 45 is turned off and an infrared light source 46 is turned on, then the spectra analysis of the infrared light reflected from the surface of the sample 44 is carried out.

That is, as mentioned above, in the infrared microscope with the aperture 36 in the rectangular shape using the four pieces of aperture plates 32–35, the following adjustment work is generally necessary:

(1) determining a position (X, Y) of the aperture 36 relative to the sample 44 by properly changing the position of the sample stand 41 in X-Y plane;

(2) determining each side length of the aperture 36 by adjusting the distance d1 between the first pair of aperture plates 32, 34 and the distance d2 between the second pair of aperture plates 33, 35; and (3) determining the angle of the aperture 36 by properly changing the rotation angle of the aperture holder 31 relative to the main body of the infrared microscope.

While the order of the above mentioned adjustment work of the aperture 36 can be changed suitably, in any case, operators are necessary to adjust as doing visual observation of the sample image whose field of view is limited by the aperture 36.

In the infrared microscope of the above mentioned structure since each aperture plate in each pair of aperture plates (32, 34 and 33, 35) are structured to move in the opposite direction from each other in synchronization by the same distance, the center of the aperture 36 ideally coincides to the rotation axis 43 of the aperture structure 30 (the rotation axis of the aperture holder 31). However, in practice, the center of aperture 36 may be off the rotation axis 43 due to the accuracy of finishing and assembling each part through the manufacturing process. Therefore, when the aperture holder 31 is rotated, the center of the sample image in the field of view of the aperture 36 changes after rotation. In an extreme case, the desired measurement point may be out of the field of view. Since a positional deviation depends on aged deterioration due to abrasion of parts and the like, even though there is no problem at the beginning of use, there is a possibility that the above problems will result from long-term use.

SUMMARY OF THE INVENTION

The present invention solves the above problems. An object of the present invention is to provide an infrared microscope capable of correcting a deviation of a sample image during aperture rotation, caused by a positional deviation between a center of an aperture and a rotation axis of an aperture.

In an infrared microscope of the present invention, deviation parameters regarding a deviation between the center of the aperture and the rotation axis of the aperture are prepared and stored in a memory in advance. The deviation parameters may be prepared, for examples by the manufacturer before shipment from a factory, and stored in the memory, such as ROM and the like. On the other hand, it is possible to install a program for measuring the deviation parameters automatically in the infrared microscope in advance, to measure the deviation parameters at every measurement by a designated operation, and to update contents stored in a readable and writable memory such as RAM and the like for the most up-to-date state.

In case of measuring a sample in practice, an operator carries out a designated operation to set up the size, shape, and angle of the aperture. When the operator operates to change an angle of the aperture relative to the sample, a rotation device rotates the aperture about the rotation axis. A control means calculates a positional deviation change amount to compensate for a deviation of the center of the aperture before and after rotation by using the relative angles through rotation and the deviation parameters stored in the memory. Then the control means controls a sample stand driving means for a sample stand to move horizontally in the opposite direction by the positional deviation change amount. By such control, the sample moves and the relative angle of the aperture changes while keeping the sample position at the center of the aperture.

The above mentioned sample stand driving means may comprise a mechanism which moves the sample stand straight in each of two directions along the X axis and along Y axis which cross at right angles to each other, suitable motors such as stepping motors and the like for driving the sample stand in each of the two directions, and a motion conversion means such as a rack and pinion gear and the like for converting rotatory motion of the motors into a straight motion. Also the above mentioned rotation means can be a structure which changes a relative angle of the aperture electrically depending on a designated operation using a suitable motor such as a stepping motor and the like.

The infrared microscope of this invention makes it possible to rotate the aperture while keeping the center of the sample image in the visual field of the aperture at a designated position even though the center of the aperture is off the rotation axis. Therefore, it becomes much easier than usual to set a visual field in a desired area of a sample. By adapting a structure to remeasure the deviation parameters at a suitable time after the start of use, a correction of positional deviation based on the most recent state becomes possible even though a state of the positional deviation changed due to variation over time and use of part and the like.

BRIEF DESCRIPTION OF THE DRAWINGS

FIGS. 4(a) and 4(b) are structural views of the main body of a typical infrared microscope around an aperture structure, wherein FIG. 4(a) shows a front view in which only aperture structure is shown as a vertical sectional view, and FIG. 4(b) shows a horizontal sectional view taken on line 4(b)—4(b) of above FIG. 4(a).

DETAILED DESCRIPTION OF THE PREFERRED EMBODIMENTS

Figure 1:
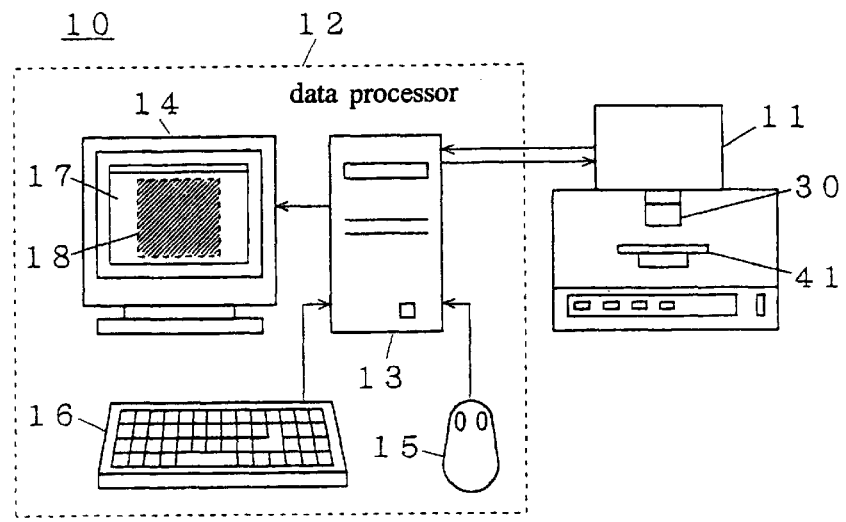
FIG. 1 is a schematic diagram showing an infrared microscope of a preferred embodiment of this invention.

The following is a detailed description of the infrared system of the present invention, with reference to the drawings. FIG. 1 shows a schematic drawing of an infrared microscope system of a preferred embodiment of the present invention. This infrared system 10 comprises an infrared analyzer 11 and a data processor 12.

Figure 4A:
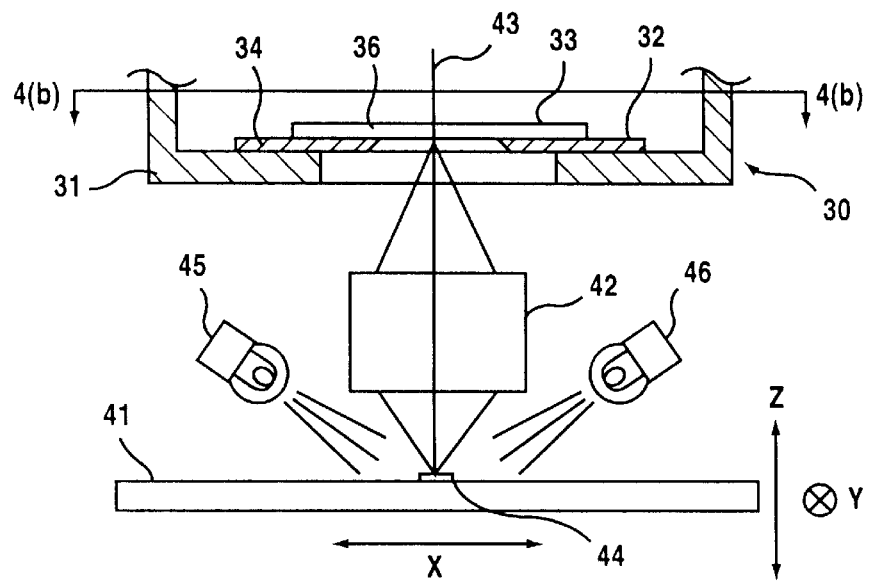
Figure 4B:
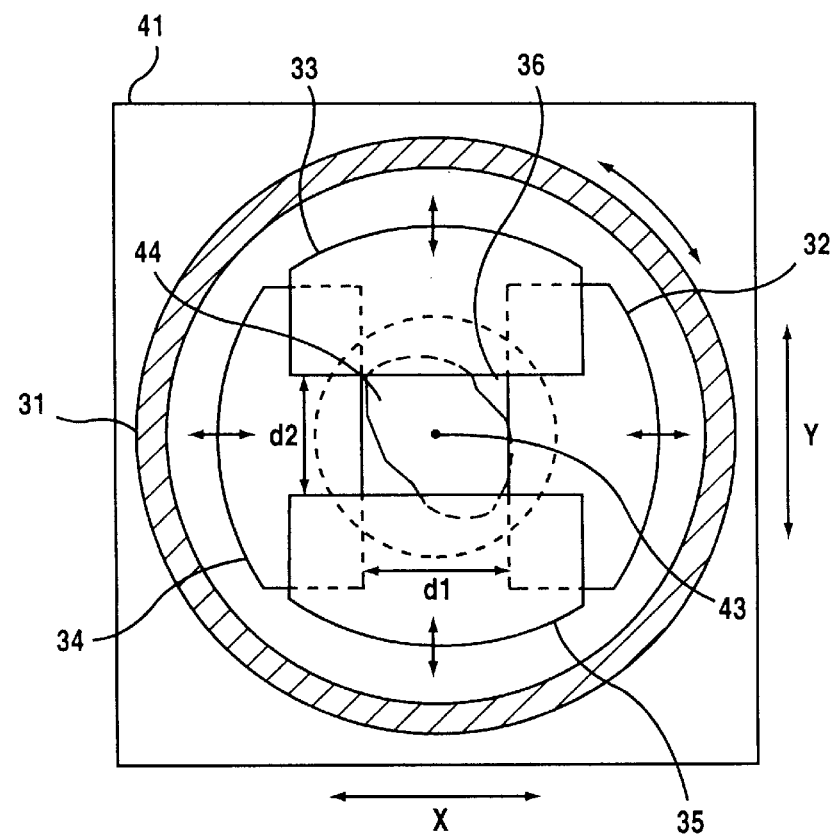

An infrared analyzer 11 has a light source irradiating infrared light and visible light to a sample, a sample stand for placing the sample, a sample stand driver for moving the sample stand in the horizontal and vertical direction, an objective optical system for imaging a sample image within an aperture structure 30 by focusing the light from the sample, the aperture structure 30 having a rectangular aperture which includes combination of plural aperture plates as shown in FIG. 4 and a rotatable aperture holder and the like which holds the aperture plates, an aperture driver for driving each part of the aperture structure 30 mechanically, and imaging part for receiving the light going through the aperture structure 30 and outputting an electrical signal. However, only the sample 41 and aperture structure 30 are shown in FIG. 1.

On the other hand, FIG. 1 depicts a data processor 12, which includes a personal computer having a central controller 13 (including a CPU and the like), a display 14, a mouse 15, and a keyboard 16. The electric signal output by the imaging part of the above mentioned infrared analyzer 11 is converted into an image signal in the central controller 13. The image signal is then sent to the display 14. Therefore, a sample image 18 whose visual field is limited by the aperture structure 30 is displayed on the screen 17 of the display 14.

Figure 2:
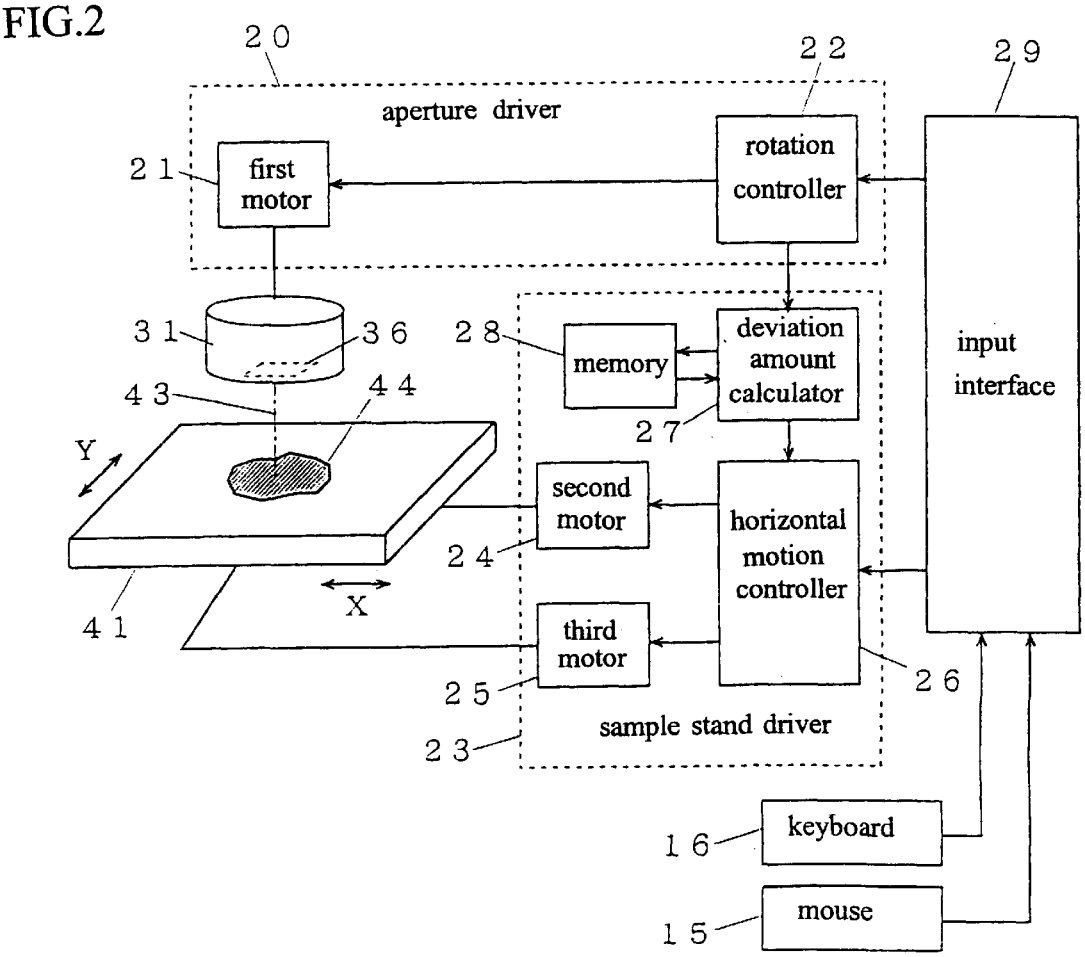
FIG. 2 is a schematic diagram showing an electrical system of a part related to an aperture adjustment in an infrared microscope of this embodiment.

FIG. 2 is a schematic diagram of an electrical system related to aperture adjustment in the infrared microscope system 10. An aperture driver 20 includes the first motor 21 and a rotation controller 22 which sends a driving pulse signal to the first motor 21. The aperture driver 20 includes a structure (not shown) which slidably moves the above mentioned aperture plates. The aperture holder 31 can be rotated within an angle range of ±45° to a standard position (the horizontal direction on the screen 17) by the first motor 21. A sample stand driver 23 includes second and third motor 24, 25 which are stepping motors, a horizontal motion controller 26 which sends a driving pulse signal to each of the motors 24, 25, a deviation amount calculator 27 which calculates a positional deviation correction amount depending on an angle provided by the rotation controller 22, and a memory 28 attached to the deviation amount calculator 27 and storing deviation parameters regarding a deviation between a rotation axis 43 of an aperture structure 30 (a rotation axis of an aperture 36) and a center of the aperture 36 in advance (the rotation axis of the aperture 36 is not the same as the center of the aperture 36). The sample stand driver 23 also includes a structure (not shown) which moves the sample stand 41 in the vertical direction (Z axis direction). The rotation controller 22 and the horizontal motion controller 26 are provided with a direction signal by an input interface 29 corresponding to an operation of the mouse 15 and keyboard 16.

Figure 3:
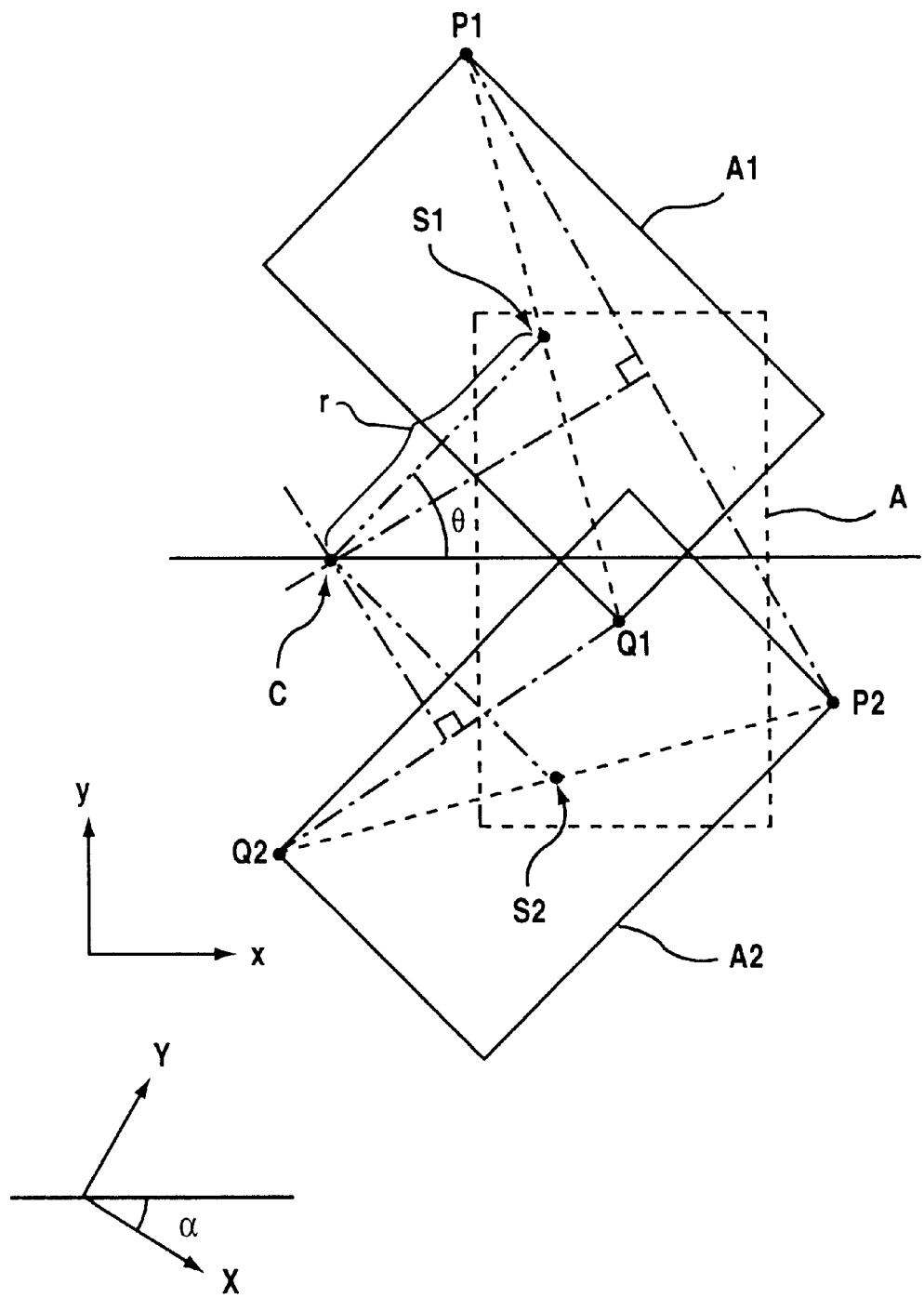
FIG. 3 is a drawing used for explaining a method for calculating deviation parameters.

First, a calculation method of the above mentioned deviation parameters is explained with reference to FIG. 3. An image of all the aperture plates 32–35 is taken by the imaging part when calculating the deviation parameters, and a rectangular aperture image is displayed on the screen 17 of the display 14. Then as shown in FIG. 3, a suitable point on the screen 17 is set as the origin, then the x axis in the horizontal direction and the y axis in the vertical direction are virtually established. The aperture 36 is shown as a broken line when the aperture exists at the standard point (θ=0°).

Second, the aperture holder 31 is rotated about the rotation axis 43 (not shown in FIG. 3) by angle θ=45° by a designated operation (the aperture 36 is at position A1), then each (x, y) coordinate of a pair of opposite points P1 and Q1 is found. Identification of each point is carried out by, for example, placing a cursor displayed on the screen 17 at the point by the operation of the mouse 15, and fixing the location of the point by clicking the mouse 15. Next, the aperture holder 31 is rotated to the position of angle θ=−45° (the aperture 36 is at position A2), then each (x, y) coordinate of a pair of opposite points P2 and Q2 is found. The coordinate of an intersection point C of each vertical bisector of a line segment P1-P2 and line segment Q1-Q2 is calculated by using each coordinate of P1, P2, Q1, Q2. Since the aperture holder 31 is expected to have a symmetrical rotation about the rotation axis 43, this intersection point C is presumed to be the position of the rotation axis 43.

The center of the aperture 36 at the position A1 or A2 can be determined as the coordinates of the mid-point of a diagonal P1-Q1 or P2-Q2. Therefore, if the x and y axes take their origin at the intersection point C, the position of (x1, y1) coordinate which is the center of the aperture 36 is shown as the following formulas (1),(2) by using the distance r from the intersection point C to the mid-point S1(or S2).

$$x1 = r \cos \theta \quad (1)$$

$$y1 = r \sin \theta \quad (2)$$

As the x axis direction on the screen 17 does not necessary coincide with the X direction of the sample stand 41, if there is a difference of angle a between them as shown in FIG. 3, the (X1,Y1) coordinate position at the center of the aperture on (X, Y) coordinates is found by the following forms (3),(4).

$$X1 = r \cos (\theta + \alpha) \quad (3)$$

$$Y1 = r \sin (\theta + \alpha) \quad (4)$$

The above amounts r and angle α may be measured and stored in the memory 28 as deviation parameters before shipment from a factory.

When carrying out a measurement, an operator carries out a designated operation related to a sample position by using the mouse 15 or keyboard 16 while observing the sample image displayed on the screen 17 of the display 14, the input interface 29 instructs a manipulated variable specified by the operator to the horizontal motion controller 26. The horizontal motion controller 26 calculates each of the movement amounts in the X axis and Y axis direction based on the manipulated variable, then determines a corresponding value for a driving pulse signal in each of the X axis and Y axis direction, and sends the respective pulse signals to the second and the third motors 24, 25, respectively. The second and the third motors 24, 25 rotate corresponding to the pulse signals, and move the sample stand 41 horizontally through a transmission structure for rotation/straight motion conversion, not shown in the Figure. According to these operations, the position of the sample image in the field of view of the aperture 36 changes.

When the operator carries out a designated operation related to an angle change of the aperture by using the mouse 15 or keyboard 16 while observing the sample image displayed on the screen 17 of the display 14, the input interface 29 instructs a manipulated variable to the rotation controller 22. The rotation controller 22 calculates an angle change amount Δθ, and calculates a value for a driving pulse signal corresponding to the angle change amount Δθ. Then it sends the driving pulse signal to the first motor 21. According to these operation, the aperture 36 repeats the rotation by a microscopic angle, and finally stops after rotating by Δθ. The rotation controller 22 provides a rotation angle θ for the deviation amount calculator 27. The deviation amount calculator 27 reads the above mentioned r and α values from the memory 28, then calculates each positional deviation amount X1, Y1 in the X axis and Y axis direction by using the above mentioned formulas (3) and (4). Then the deviation amount calculator 27 calculates the difference (ΔX1, ΔY1) from the deviation amount before rotation, and sends it as a positional deviation change amount (ΔX1, ΔY1) to the horizontal motion controller 26.

After the horizontal motion controller 26 receives the positional deviation change amount (ΔX1, ΔY1), it calculates each value of the driving pulse signals to move the sample stand 41 by ΔX1, ΔY1 in each of the X axis and Y axis directions. Then it sends these pulse signals to the second and third motors 24, 25. According to these operations, the sample stand 41 moves so that the point on the sample 44 designated by the center of the aperture 36 before rotation comes to the center of the aperture 36 after rotation.

The above mentioned embodiment stores the deviation parameters in the memory 28 in advance. However, the memory 28 may be a rewritable memory and structure may be provided to remeasure the above mentioned deviation parameter r (α hardly changes). According to these operations, even though a state of the positional deviation between the center of the aperture and the rotation axis thereof changes from the beginning state, by updating the deviation parameter by remeasuring, a state after rotation in which the center of the aperture 36 coincides to the point on the sample 44 designated by the center of the aperture 36 before rotation can always be kept.

A preferred embodiment was described above. However, it should be understood that this invention covers all change and modification apparent to one skilled in the art without departing from essential characteristic thereof.

What is claimed is:

1. An infrared microscope comprising:
   a sample stand with a sample placed thereon;
   an aperture structure having an aperture with a variable size and shape;
   a rotation device that rotates said aperture structure about an rotation axis to change an angle of said aperture relative to said sample on said sample stand;
   sample stand driving means for moving said sample stand in a horizontal direction;
   a memory storing deviation parameters regarding a deviation between a center of said aperture and said rotation axis; and
   control means for controlling said sample stand driving means based on at least said parameters in said memory to keep said center of said aperture after rotation at the point on said sample designated by said center of said aperture before rotation.

2. An infrared microscope according to claim 1, wherein said aperture structure comprises two pairs of aperture plates and an aperture holder slidably holding said aperture plates.

3. An infrared microscope according to claim 2, further comprising:
   an aperture driver moving each aperture plate in each pair of said aperture plates in an opposite direction from each other by the same distance in synchronization with each other.

4. An infrared microscope according to claim 1, wherein said sample stand driving means comprises two drivers, each of said drivers driving said sample stand in two respective directions along an X-axis and a Y-axis crossing at a right angle with each other;

said rotation device provides said control means with relative angles before and after rotation of said aperture;

said control means comprises:
  a deviation amount calculator calculating a positional deviation change amount in each of said two directions to correct a differential of positional deviation between said center of said aperture before and after rotation based on both said deviation parameters and said relative angles; and
  a horizontal motion controller for controlling said two drivers to move said sample stand by said positional deviation change amount.

5. An infrared microscope according to claim 4, further comprising:

image means for imaging said whole aperture; and a display for displaying an image of said whole aperture, wherein said deviation parameters include a distance r between said center of said aperture and said rotation axis, and a deviation angle α- between x-y axis coordinates set on said display and said X-Y axis coordinates, said deviation amount calculator calculating said positional deviation (X1,Y1) between the center of said aperture and said rotation axis on said X-Y axis coordinate with the following formula, $$X1 = r \cos(\theta + \alpha)$$

$$Y1 = r \sin(\theta + \alpha)$$

and then determining said positional deviation change amount by calculating the differential ($\Delta X1, \Delta Y1$) of said positional deviation between before and after rotation by said rotation drive.

6. An infrared microscope according to claim 1 further comprising:

parameter calculating means for calculating said parameters.

7. An infrared microscope according to claim 6, wherein said deviation parameters include a distance between said center of said aperture and said rotation axis.

8. An infrared microscope according to claim 7, wherein said parameter calculating means calculates said distance by identifying first x-y axis coordinates of a pair of opposite points P1 and Q1 of said aperture when the aperture holder 31 is rotated by an angle θ of 45° relative to x-y axis and second x-y axis coordinates of a pair of opposite points P2, Q2 at respective location on said aperture as points P1 and Q1 when the aperture holder 31 is rotated by an angle θ of 45°, determining coordinates of an intersection point C of each vertical bisector of a line segment P1-P2 and line segment Q1-Q2, and then calculating a distance between the coordinates of a mid-point of a diagonal P1-Q1 or P2-Q2 and said intersection point C.

9. A method of using an infrared microscope comprising steps of:

placing a sample on a sample stand, changing a size and shape of an aperture depending on a desired part of said sample, rotating said aperture about a rotation axis to change an angle of said aperture relative to said sample depending on said desired part, calculating a positional deviation change amount between a center of said aperture before and after rotation based on at least deviation parameters regarding a deviation between said center of said aperture and said rotation axis, moving said sample stand in a horizontal direction by said positional deviation change amount.

10. A method of using an infrared microscope comprising steps of:

placing a sample on a sample stand, calculating a distance between the center of an opening part of an aperture and a rotation axis of an aperture, changing a size and shape of said aperture depending on a desired part of the sample, rotating said aperture about an rotation axis of said aperture to change an angle of said aperture relative to said sample depending on said desired part, calculating a positional deviation change amount between said center of said aperture before and after rotation based on at least said distance, moving said sample stand in a horizontal direction by said positional deviation change amount.

* * * * *